United States Patent [19]

Baciu

[11] Patent Number: 4,459,257
[45] Date of Patent: Jul. 10, 1984

[54] PROCESS FOR PRODUCING A SHAPED ARTICLE BY INJECTION MOULDING

[75] Inventor: Antoine Baciu, Anbevoye, France

[73] Assignee: Cibie Projecteurs, Bobigney, France

[21] Appl. No.: 509,208

[22] Filed: Jun. 29, 1983

[30] Foreign Application Priority Data

Jul. 5, 1982 [FR] France .................... 82 11748

[51] Int. Cl.³ .................... B29C 6/02; B29D 3/00; B29D 9/00
[52] U.S. Cl. .................... 264/255; 264/279; 264/328.8; 264/336; 264/348
[58] Field of Search .............. 264/255, 242, 336, 279, 264/279.1, 271.1, 250, 348

[56] References Cited

U.S. PATENT DOCUMENTS

| 3,187,072 | 6/1965 | Morin | 264/242 |
|---|---|---|---|
| 3,263,013 | 7/1966 | Morin | 264/242 |
| 3,785,217 | 1/1974 | Peura | 264/242 |
| 3,878,282 | 4/1975 | Bonis et al. | 264/255 |
| 3,966,870 | 6/1976 | Vecchiotti | 264/255 |
| 4,048,361 | 9/1977 | Valyi | 428/483 |
| 4,092,391 | 5/1978 | Valyi | 428/483 |
| 4,155,972 | 5/1979 | Hauser et al. | 264/271.1 |

FOREIGN PATENT DOCUMENTS

| 1156217 | 6/1969 | United Kingdom . |
|---|---|---|
| 1247911 | 9/1971 | United Kingdom . |
| 1339445 | 12/1973 | United Kingdom . |
| 1370075 | 10/1974 | United Kingdom . |
| 1420948 | 1/1976 | United Kingdom . |

Primary Examiner—Willard E. Hoag
Attorney, Agent, or Firm—McCormick, Paulding and Huber

[57] ABSTRACT

The process for producing a shaped article comprising a polythene terephthalate (PETP) core containing from 0 to 50% of mineral fillers and a covering layer of a second thermoplastics material having a softening point below that of the PETP. The second material and the PETP are injected one after the other into a mould which is maintained at a temperature below the crystallization point of the PETP having regard to its fillers. The second material injected in the first phase acts as a thermal buffer slowing down temperature equalization between the PETP injected in the second injection phase and the mould, thus ensuring the required properties in the PETP core.

8 Claims, 4 Drawing Figures

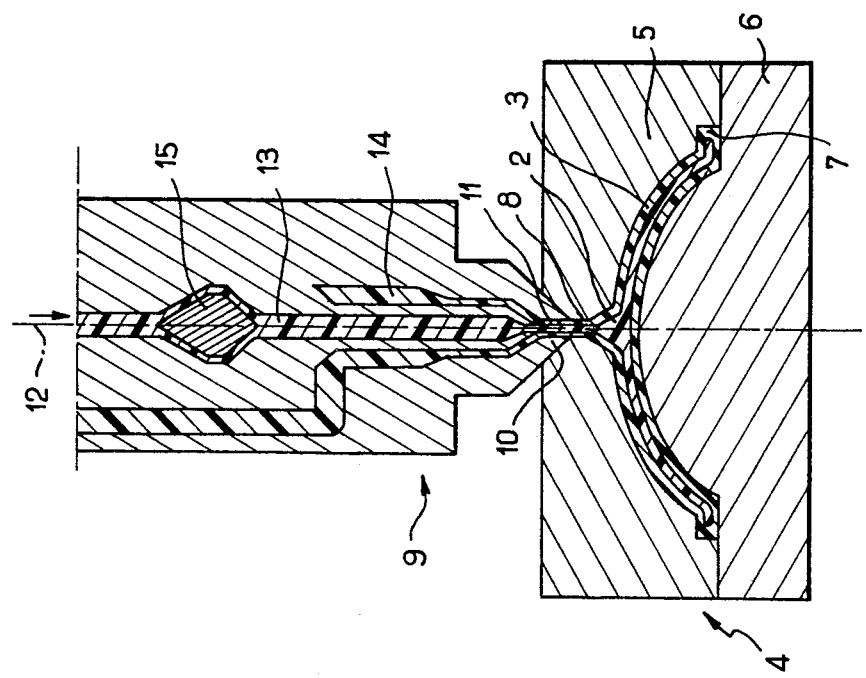
FIG_1
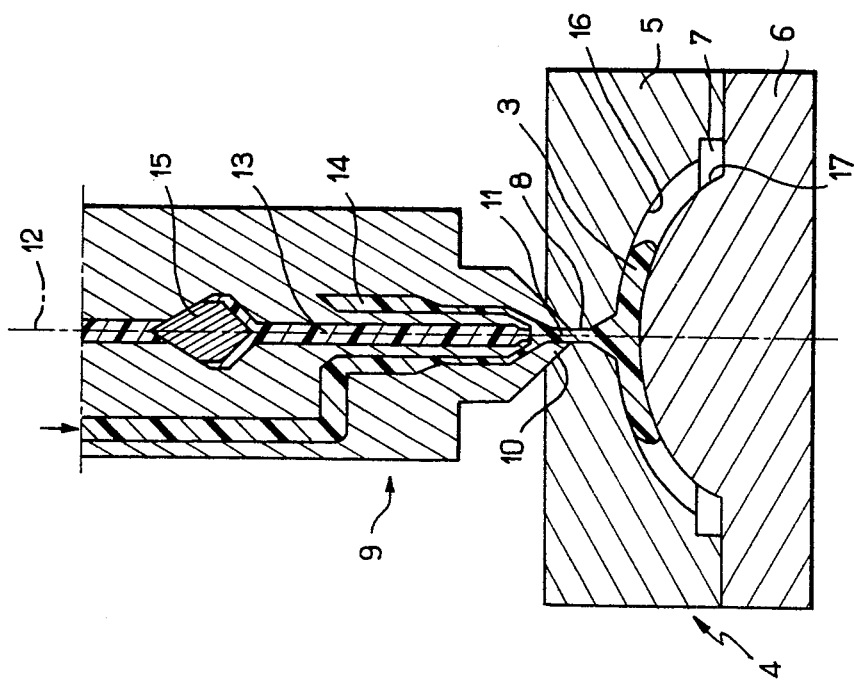
FIG_2

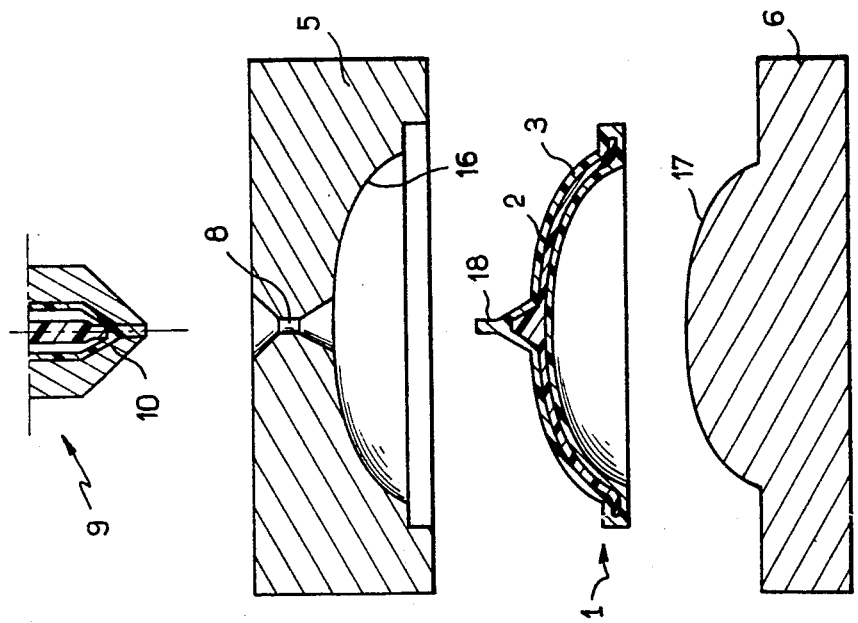
FIG_4
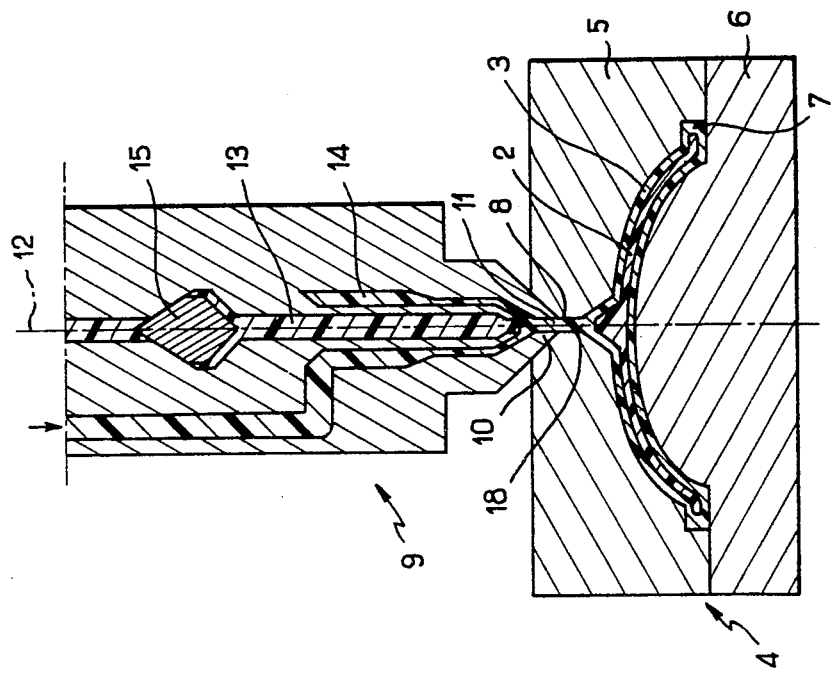
FIG_3

PROCESS FOR PRODUCING A SHAPED ARTICLE BY INJECTION MOULDING

BACKGROUND OF THE INVENTION

This invention relates to a process for the production of a shaped article by injection moulding and to the article prepared by the process.

The invention relates more particularly to the production of shaped articles comprising a core of polythene terephthalate, PETP, covered by a covering layer of some other thermoplastics material such as polybutylene terephthalate, PBTP.

When PETP is injected at its normal transformation temperature, which is higher than its softening point and is, for example, of the order of from 210° to 220° C., into a mould heated to the order of 130° C. (i.e. in conditions obviating thermal shock), it acquires by slow cooling, at a temperature a little below 140° C., a very homogeneous opaque semicrystalline structure. This has outstanding mechanical and physical properties, a high resistance to chemical attack and the ability to withstand stress cracking, notably when it contains up to 50% of mineral fillers.

The structure produced tends to have a very low coefficient of heat expansion—$1.8.10^{-5}$—and is virtually totally devoid of internal stresses, with the result that the articles made from the material have very little tendency to distort in use even at high temperatures.

Also, the remarkable rigidity of the end products (flexure modulus of the order of 16,000 meganewtons/m$^2$) and the high flexure temperature of the order of 240° C., enable the ordinary thickness of the articles to be reduced, with a consequent weight saving.

Also PETP is cheaper than other such crystalline products.

However, despite its qualities when treated under these temperature conditions, PETP has not become widely established. The high filler content which can be used and which contributes in no small way to its excellent properties tends to impair the surface of the end products, which have a shiny and heterogeneous appearance making them impossible to use for purposes where a smooth surface texture is required.

Furthermore, the need to heat the mould, and then to cool down slowly from the injection temperature to less than 140° C. in order to produce a semicrystalline structure, results in considerable energy expenditure and lower rates of output which are generally unsuitable for industrial operations. Also the rigidification temperature of PETP is well below 140° C. and a further factor which slows down output is that, even though the crystallization temperature may have been reached, the article cannot be removed from the mould until it has cooled to the rigidification temperature.

SUMMARY OF THE INVENTION

It is an object of the present invention to obviate these disadvantages of PETP and thus to enable its use on an industrial scale for the preparation of articles having a smooth surface texture while retaining the mechanical, physical and chemical characteristics arising from a semicrystalline structure of PETP.

According to the invention, there is provided a process for the production of a shaped article comprising a core of a first thermoplastics material and a covering layer of a second thermoplastics material, the process comprising in a first phase pressure-injecting the second material into a mould defining at least one impression of the article while the second material is at an injecting temperature above the softening point of the first material; then in a second phase pressure-injection into the mould the first material at an injection temperature between its softening point and the injection temperature of the second material in the requisite quantities for forming the covering layer and core respectively; then removing the finished article from the mould; and in which process the first material is a polythene terephthalate containing from 0 to 50% mineral fillers and the second material is a different thermoplastics material having a lower softening point than that of the polythene terephthalate; the two injection phases are performed immediately consecutively while the mould is maintained at a temperature below the softening point of the second material and below the crystallization temperature of the polythene terephthalate containing its proportion of fillers; and in the second phase the second material which was injected in the first phase acts as a heat buffer slowing down temperature equalisation between the polythene terephthalate and the mould.

The invention accordingly proproses to use a two-material injection process for the production of articles having a core of semicrystalline PETP with the corresponding mechanical, physical and chemical characteristics and a covering layer of another thermoplastics which can provide a smooth surface texture.

If, PETP is injected at its normal transformation temperature, i.e. at a temperature higher than its softening point, into a mould whose temperature is higher than 130° C. a semicrystalline structure develops which is very advantageous as regards mechanical, physical and chemical properties. However, the injection of PETP at its normal transformation temperature into a "cold" apparatus results in articles which are completely transparent and have an amorphous structure but are unsuitable for the manufacture of industrial and technological items because of unsatisfactory physical characteristics, which greatly resemble those of polyvinyl chloride, PVC.

Clearly, one possible way of obviating an amorphous structure of this kind would be to use a mould heated to the order of 130° C., then to arrange for slow post-injection cooling of the mould and its contents with a view to producing the required semicrystalline structure. However, such a method would be slow and expensive and if it were decided to employ a two material injection process it could be quite difficult to find a material for the covering layer of thermoplastics which would be satisfactory.

It has been discovered unexpectedly, by the Applicants that the use of a two material injection process in accordance with the invention obviates these drawbacks. In a particularly preferred process, the use of a cold mould maintained, for instance at a temperature of at most 60° C. to produce articles comprising a PETP core and a thermoplastics material covering, results in a core having the semi-crystalline structure desirable for industrial and technological articles.

Consequently, although the injection is carried out in a cold mould, (in practice a temperature of at most approximately 60° C., the mould temperature normally used for the other thermoplastics) whereas the crystallization point of the PETP is a little below 140° C., the PETP cools slowly enough to acquire the very advantageous semicrystalline structure referred to above and not the amorphous structure which is normally associated with cold mould injection and which it is the object of the invention to obviate. Furthermore, this structure is produced with a reduced energy consumption since there is no need to heat the mould to 130° C.

In addition, the end products have a smooth surface texture which is due to the presence of the covering layer and which makes the article suitable for a wide range of uses.

Also, to the extent that the covering layer in direct contact with the cold mould is likely to harden more rapidly than the PETP core, the article can be removed from the mould when only a skin of the surface layer has hardened—i.e. even before the PETP has reached its rigidification temperature of very much below 140° C.—so that mould release is faster than in the case of hot mould PETP injection processes with slow cooling in the mould, such as are conventional for producing shaped articles of PETP having the required semicrystalline structure. Thus, the finished article may be removed from the mould after the second material has rigidified but before the polythene terephthalate has rigidified.

In another known process for preparing shaped PETP based articles having the required semicrystalline structure, plates or panels of the material are formed in conditions resulting in a semicrystalline structure. These are then cut to size and hot stamped. This comparatively complex method also takes longer to carry out than the process according to the invention and requires substantial equipment and numerous manipulations. Also, producing shaped articles by hot stamping panels may produce internal stresses which impair the dimensional stability, particularly at high temperature, of the end products and which may therefore make them unsuitable for some industrial technological purposes, for instance, in the motor vehicle industry.

Thus, the process according to the invention may differ from the known processes by its relative economy and relative rapidity of operation while still leading to the required semicrystalline PETP structure, with corresponding advantageous mechanical, physical and chemical characteristics of the end product and an advantageous smooth surface texture.

The second material may be a terephthalate of polybutylene and is preferably injected at an injection temperature up to 240° C. The PETP is preferably injected at a temperature of the order of from 210° to 220° C. The second material and the PETP are preferably injected in proportions of one-third and two-thirds, respectively, of the total volume of the mould impression, and preferably, the combined duration of the two injection phases is of the order of two seconds.

In a further preferred method there may be an auxiliary injection phase of the second thermoplastics between the second injection phase and removal of the article from the mould.

The invention also extends to an article made by a process according to the invention, and comprising a polythene terephthalate core containing from 0 to 50% of mineral fillers and a covering layer of any other thermoplastics material having a lower softening point than polythene terephthalate, the core having a semicrystalline structure.

BRIEF DESCRIPTION OF THE DRAWINGS

FIG. 1 is a section on a central plane through the injection passage and mould, showing the first injection phase;

FIG. 2 is a view similar to FIG. 1 showing the second injection phase;

FIG. 3 is a view similar to FIGS. 1 and 2 showing an additional optional injection phase, and FIG. 4 is a view similar to FIGS. 1 to 3 showing the removal of the article from the mould.

DESCRIPTION OF THE PREFERRED EMBODIMENTS

The illustrated embodiments relate to the moulding of a dished article 1 for use, for instance, as the cover or casing for a rear-view mirror or measuring instrument or, after metallization, as a side lamp or headlamp reflector. However, the invention is not limited to this shape and the article can be of any shape suitable for moulding by a two-material process.

As shown in FIG. 4 the article 1 to be produced has a core 2 made of PETP having from 0 to 50% of mineral fillers such as mica, biotites, etc., and a covering layer 3 of some other thermoplastics material. This material can be of any kind, crystalline or amorphous, provided that its softening point is below that of PETP and it can be injected at higher temperatures than PETP, for instance, at temperatures of the order of 240° C. By way of example the covering layer 3 can be of polycarbonate resin, ABS, polystyrene, methacrylate or PBTP in the example now to be described.

As in any moulding process the first stage is to devise a mould 4, which here takes the form of two shells 5, 6 internally defining an impression 7 of the required article and having an injection passage 8—in the shell 5 via which the impression 7 communicates with the exterior of the mould. Vents (not shown) are also provided.

The passage 8 has at its outside opening a shape enabling it to receive the exit 10 of an injection nozzle 9 to form a hermetic seal relative to the mould 4. The nozzle 9 is a distributing nozzle for use in a two-material injection process. The nozzle 9 has at its exit 10 a single exit passage 11 disposed on an axis 12 which is also the axis of the passage 8 when the nozzle exit 10 is engaged in the opening of the passage 8 for injection. Inside the nozzle 9 the exit passage 11 communicates with two feed passages 13, 14 one for each of the two thermoplastics materials to be injected. The passage 13 is located along the axis 12 being an extension of the exit passage 11 inside the nozzle 9 and has in it a controllable closure member 15 which, in dependence upon its position in the passage 13, either closes the passage 13 or permits communication through the passage 13 between the exit passage 11 and means for supplying the thermoplastics material which will subsequently form the core 2 of the article—i.e., PETP. The means for supplying the PETP (not shown) are known and take the form, for instance, of a screw rotating inside a sleeve heated to a temperature such that the thermoplastics is at an injection temperature higher than its softening point. The sleeve communicates at one end with a feed hopper and at the other end with the passage 13, to which the screw feeds the thermoplastics material at the injection temperature.

At the junction of the passage 13 with the exit passage 11, between the closure member 15 and the latter, a second passage 14 also joins the exit passage 11. The second passage 14 has two zones—a first zone which is adjacent the exit passage 11 and is in the form of an annulus of revolution around the axis 12 and extends externally around the passage 13, while the second zone connects the first annular zone to means for feeding the second thermoplastics material which will subsequently form the covering layer 3, for instance, PBTP in this embodiment. Again these means for feeding are not shown but can be similar to the PETP feeding means described above. They feed the passage 14 with PBTP heated to an injection temperature higher than its softening point and higher than the injection temperature of the PETP fed through the channel 13.

When the mould 4 is closed, with its shells 5, 6 being retained firmly in the assembled state, and when the exit 10 of the nozzle 9 is applied to the opening of the injection passage 8 so that the passages 11, 8 are in alignment the first injection phase shown in FIG. 1 begins.

In this first phase the closure member 15 closes the passage 13 and only the passage 14 is in operation. In it, the quantity of PBTP needed to form the covering layer 3 is brought to the exit passage 11 and injected into the mould impression 7 through the injection passage 8. Satisfactory results have been obtained with a PBTP injection temperature of the order of 240° C. and with a mould temperature of approximately 60° C., the normal mould temperature for PBTP injection moulding.

When the quantity of PBTP needed to form the layer 3 has been injected, in this case a volume equal to approximately one-third of the total volume of the impression 7, the second injection phase shown in FIG. 2 is begun immediately. In the second phase the feeding of PBTP is interrupted and the closure member 15 is moved to open the passage 13. PETP heated to an injection temperature between its softening point and the PBTP injection temperature, in this case of the order from 210° to 220° C., is introduced through the passages 13, 11, 8 into the mould impression 7.

The PETP thus introduced contains from 0 to 50% of mineral fillers, in dependence upon the required characteristics of the end product 1.

The PETP is introduced in an amount sufficient to fill up the mould impression and represents at least half the total volume of the impression 7 and in the present case represents approximately two-thirds of the volume. It penetrates into the PBTP and thrusts the PBTP before it so that the PBTP engages with the mould cavity surfaces 16, 17 in shells 5, 6 respectively and thus forms a sheath around the PETP during injection.

The sheath, which is destined to become the layer 3 and which therefore has the same reference numeral in FIG. 2, creates a thermal buffer between the shells 5, 6 of the mould 4, whose temperature is not increased, and the PETP introduced. The thermal buffer slows down temperature equalization between the PETP and the mould 4.

Consequently, although the mould 4 experiences only a very reduced temperature rise in these two injection phases, since its total duration is so short—something like two seconds in practice in a form of the process which satisfactory test results—the PETP introduced into the second injection phase reaches the crystallization point of a little below 140° C. slowly enough for the core 2 of the article 1 to have the required semicrystalline structure.

Furthermore, since the PBTP injection temperature is higher than the PETP injection temperature and since only those zones of the PBTP which might be in direct contact with the mould surfaces 16, 17 would undergo rapid temperature equalization with the mould 4 (whereas the other zones remain for longer at a much higher temperature than the mould), the PBTP introduced in the first injection phase can contribute heat to the PETP introduced in the second phase and thus tends to maintain the PETP longer at a temperature above its crystallization point thus slowing down the cooling of the PETP to its crystallization point. Consequently, the PETP acquires the required semicrystalline structure despite being injection moulded in a "cold" mould.

In a third and optional injection phase, shown in FIG. 3, PETP injection is interrupted by moving the closure element 15 into a position closing the passage 13, and a fresh injection of PBTP is made to remove all traces of PETP from the inside of the injection passage 8 on the insid of the impression 7, so that after mould release and sectioning of the sprue 18 corresponding to the substance in the passage 8, complete embedding of the PETP core 2 in the covering PBTP layer 3 is provided.

The article can then be released from the mould. Mould release can be carried out even before the PETP has reached its rigidification temperature, which is well below 140° C., since the covering layer, of PBTP in the present case, has become sufficiently rigid for the article 1 to be removed from the mould long before the core 2 has reached its rigidification temperature.

This mould release phase is shown in FIG. 4. It is accompanied by the sectioning of the sprue 18, consisting entirely of the PBTP of the covering layer 3 as hereinbefore described.

The complete injection moulding cycle proceeds very rapidly and makes the process according to the invention feasible for use on an industrial scale. Use of the process provides substantial economies which are further enhances because the mould 4 requires no heating by means other than the injection of the two thermoplastics at their respective injection temperatures.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A process for the production of a shaped article of the type comprising a core of a first thermoplastics material and a covering layer of a second thermoplastics material, said process comprising:
   in a first step pressure-injecting said second material into a mould defining at least one impression of said article, while said second material is at an injection temperature above the softening point of said first material;
   then in a second step pressure-injecting into said mould said first material at an injection temperature between its softening point and said injection temperature of said second material, said first and second materials being injected in the requisite quantities for forming said covering layer and said core respectively;
   cooling said materials until at least the outer layer is solidified;
   then removing the finished article from said mould;
   and in which process said first material is a polythene terephthalate containing from 0 to 50% mineral fillers and said second material is a different thermoplastics material having a lower softening point than that of said polythene terephthalate; said two injection steps are performed immediately consecutively while said mould is maintained at a temperature below said softening point of said second material and below the crystallization temperature of said polythene terephthalate containing its proportion of fillers to provide a semi-crystalline core structure; and in which process in said second step said second material which was injected in said first step acts as a heat buffer slowing down temperature equilisation between said polythene terephthalate and said mould.

2. A process according to claim 1, wherein said finished article is removed from said mould after said second material has rigidified but before said polythene terephthalate has rigidified.

3. A process according to claim 1 wherein said second thermoplastics material is a material selected from the group consisting of polybutylene terephthalate, polycarbonate, ABS, polystyrene and methacrylate.

4. A process according to claim 1 wherein said second material is injected at an injection temperature of the order of 240° C. and said polythene terephthalate is injected at a temperature of the order of from 210° to 220° C.

5. A process according to claim 1 wherein said second material and said polythene terephthalate are injected in proportions of one-third and two-thirds, respectively, of the total volume of said mould impression.

6. A process according to claim 1 wherein the combined duration of said two injection steps is of the order to two seconds.

7. A process according to claim 1 which further includes an auxiliary injection step of said second thermoplastics material between said injection step and the removal of said article from said mould.

8. A process according to claim 1 wherein said mould temperature is maintained at approximately sixty degrees celcius.

* * * * *